Oct. 15, 1940.  L. BULAT  2,218,257
AUTOMOBILE HOOD LOCK
Filed March 21, 1938  2 Sheets-Sheet 1

Luban Bulat,
INVENTOR

BY Victor J. Evans & Co.
ATTORNEYS

Oct. 15, 1940.　　　　L. BULAT　　　　2,218,257
AUTOMOBILE HOOD LOCK
Filed March 21, 1938　　　2 Sheets-Sheet 2
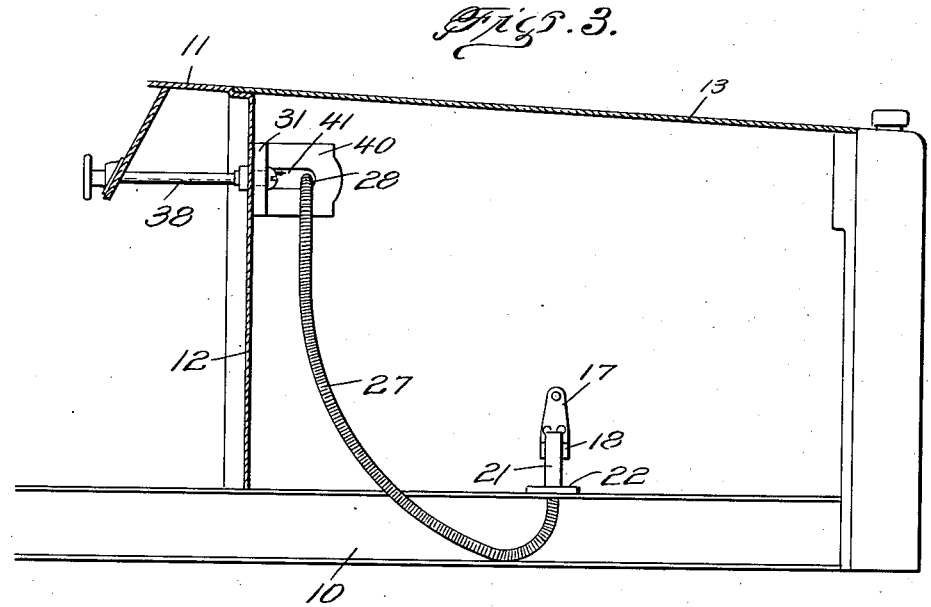
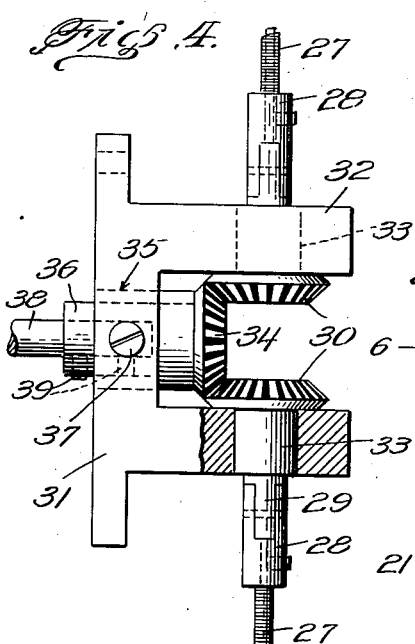
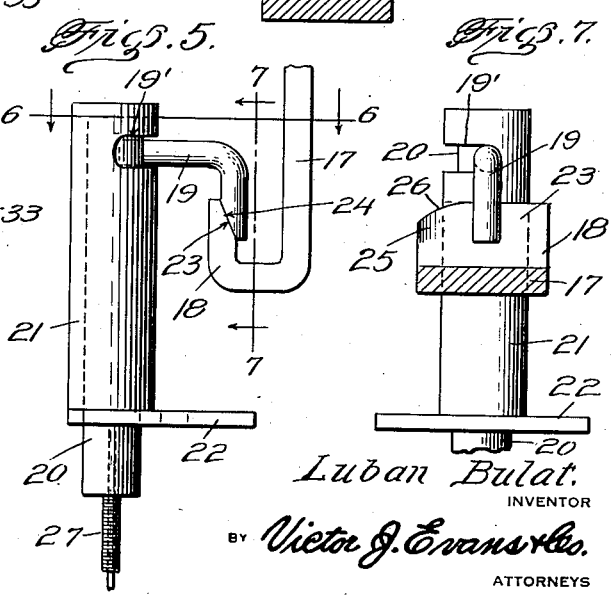

Patented Oct. 15, 1940

2,218,257

UNITED STATES PATENT OFFICE 2,218,257

AUTOMOBILE HOOD LOCK

Luban Bulat, Cleveland, Ohio

Application March 21, 1938, Serial No. 197,255

2 Claims. (Cl. 292—28)

This invention relates to automobile hood locks and it has for its principal object to provide a simple yet practical and efficient internal locking means for the hood, operable from the instrument board or other convenient location within the body of the vehicle whereby to be locked and unlocked, at will, when occasion requires, but effectively preventing unauthorized opening of the hood and tampering with the parts thereunder.

A further object is to provide for positive actuation of the locking means and for the simultaneous locking and unlocking of the hood at opposite sides thereof.

With the foregoing and other objects to be attained, as will hereinafter more fully appear, the invention consists in the novel latching means and manipulating mechanism in its general structure and in the particular parts and combinations and arrangements of parts thereof, all as hereinafter specified and pointed out in the appended claims, reference being had to the accompanying drawings illustrating a practical adaptation of the invention, and in which Figure 1 is a horizontal longitudinal section through the hood and adjacent forward body portion of an automobile, showing the hood latching means and operating mechanism therefor applied thereto;

Figure 3 is a vertical longitudinal section;

Figure 4 is a detail plan view of the supporting bracket and cooperating gears mounted thereon;

Figure 5 is a side elevation of the latch bolt mounting detached and the hooked extension of the bolt engaged with the locking bracket or keeper of the hood;

Figure 6 is a horizontal section taken on or about the line 6—6 of Figure 5; and Figure 7 is a partial elevation and vertical section taken on or about the line 7—7 of Figure 5.

Figure 1:
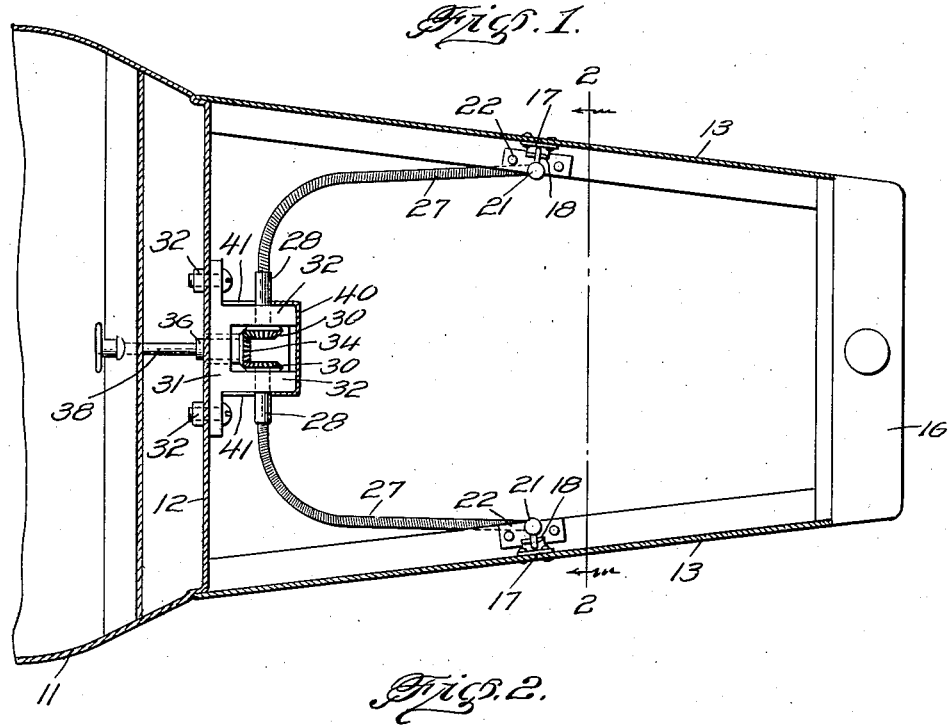

Referring now to the drawings the numeral 10 designates the longitudinal side members of the chassis or supporting under-frame for the automobile body, the forward portion of which latter is shown and designated, at 11, in Figures 1 and 3 of the drawings. At the front of the body 11 is the usual transverse partition or dashboard 12, forwardly beyond which is the usual hood or housing 13 which encases the motor and its associated parts and the other appurtenances of the vehicle usually located forward of the dashboard. As shown, the hood 13 comprises the two half sections as commonly provided on the ordinary automobile, said sections being hinged at their meeting longitudinal top margins, as at 14. However, as far as the present invention is concerned, the hood may be of any other form and arrangement.

Figure 2:
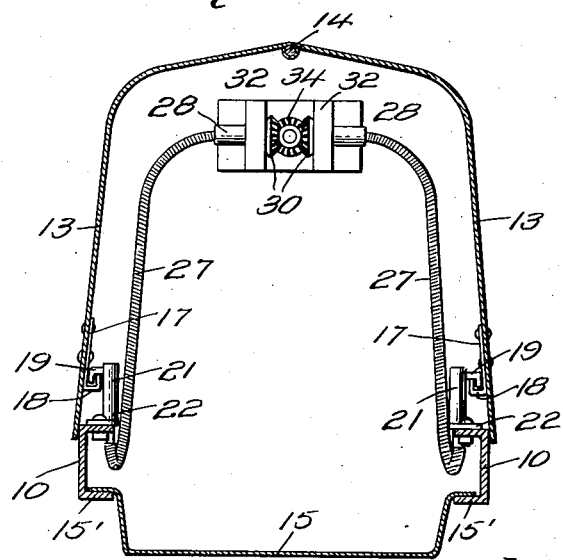
Figure 2 is a transverse section taken substantially on the line 2—2 of Figure 1.

Instead of the latching means usually provided exteriorly of the hood, the present invention contemplates, in its broad aspect, the locating of the latching means interiorly of the hood, and in this connection, it is noted that access to the interior of the hood is practically impossible except by opening the hood, because of the provision of the usual bottom closure pan 15 provided beneath the hood between the partition or dashboard 12 and the usual radiator assembly 16 located on the chassis frame at the front end of the hood, said pan 15 being usually flanged, as at 15' and supported on the lower flanges of the longitudinal side members 10 of the chassis as shown in Figure 2.

In the preferred embodiment of the invention as illustrated in the accompanying drawings, the latching means comprises a bracket 17 located on the inner face of the hood side wall near the lower edge thereof, said bracket 17 having an upturned flange 18 at its lower end for the engagement of a hooked extension 19 on a swiveled latch bolt 20 which is mounted in a tubular upright extension 21 of a bracket 22, which latter is secured to the upper flange of the adjacent side member 10 of the chassis. Said hooked extension 19 projects through a horizontal slot 19' in the tube 21 whereby said member 19 is permitted limited swinging movement but the bolt 20 is held against endwise movement.

The engagement of the latch hook 19 with the flange 18 of the bracket or keeper 17 is effected by rotation of the bolt 20, and to facilitate the engagement and release of the member 19 from the flange 18, the latter is beveled on its inner face, near the top thereof and throughout its width as at 23, and the inner engaging portion of the hook 19 is correspondingly beveled, as at 24; and to initially guide the hooked portion 24 onto the flange 18, the latter is further tapered towards its end as at 25 and reduced at its adjacent top portion, as at 26, so as to provide an easy lead for the hook 19.

Attached to each bolt 20 is a flexible shaft 27, said shafts being respectively provided at their opposite ends with coupling members 28, and each coupling member being attached to the projecting spindle portion 29 of a beveled gear 30 journaled in a bracket member 31 attached to the dashboard 12.

As shown, the bracket 31 is bolted to the dashboard, as at 32, and said bracket is provided with a pair of horizontal generally rectangular extensions 32 in which the gears 30 are journaled, as at 33, in opposed relation to each other, said gears 30 are journaled, as at 33, in opposed relation to each other, said gears 30 being engaged by an intermediate driving gear 34 journaled in the base portion of the bracket 31. Preferably, a bearing bushing 35 is provided in the bracket 30 for the shank portion 36 of said gear 34, the bushing being fastened in the bracket 31 by a set-screw 37. Thus, by rotating the gear 34 the opposed engaged gears 30 are obviously rotated in opposite directions with respect to each other and the flexible shafts 27 are accordingly rotated in opposite directions, thereby causing the latch bolts 20 to rotate also in opposite directions. Therefore, the flange portions 18 of the keeper brackets 17 at opposite sides of the hood 13 are disposed with their lead portions 25 in the same longitudinal direction, that is to say, the lead portions 25 of the flanges 18 may be located in the same direction either forwardly or rearwardly, so that, upon operation of the bolts 20 simultaneously, as occurs upon rotation of the gear 34 and the connecting shafts 27 and gears 30, the hook portions 19 of the two bolts 20 ride onto or from the flanges 18 simultaneously, according to the direction in which the gear 34 is rotated.

For convenience in rotating the gear 34, said gear is provided with an axial bore in its shank portion 36, in which the end portion of a controlling and manipulating shaft 38 is inserted and secured by a pair of set-screws 39, which latter are countersunk below the circumferential face of said shank portion 36, particularly the one of said set-screws which is located within the bushing 35.

By beveling the engaging portions 23 and 24 of the keeper bracket flange 18 and the latch hook extension 19, and the further provision of the contiguous tapered and reduced lead portions 25 and 26, respectively, of said keeper flange 18, not only is the member 19 guided onto and from the flange 18, as hereinbefore described, but the parts 18 and 19 may be relatively positioned so that there is a tight engagement therebetween and a substantial springing effect is created in the adjacent portions of the hood 13 so as to prevent rattling.

Preferably, a sheet metal casing 40 is placed on the supporting bracket 31 as a protection for the gears 30 and 34. As shown, this casing 40 is in the form of a substantially rectangular box provided with slots 41 on its opposite side walls to clear the projecting spindle portions 29 of the gears 30 and the attached couplings 28 when the housing is applied, said housing being held in place on the extensions 32 of the supporting bracket 31 merely by the frictional engagement therewith or, if desired, any suitable fastening means may be provided.

Obviously, the structure admits of considerable modification without departing from the spirit and scope of the invention as defined in the appended claims, the invention, therefore, is not limited to the specific construction and arrangements shown in the accompanying drawings.

What is claimed is:
1. In an automobile hood locking assembly of the kind including keeper elements located inside the hood of the automobile on the opposite lower side wall portions of the hood and further including latching elements mounted on adjacent fixed parts of the automobile body frame and movable into and out of engagement with said keeper elements, said latching elements each having a rotatable actuating part, operating means for simultaneously moving the latching elements into and out of engagement with the keeper elements, said means comprising a supporting bracket carrying thereon a pair of opposed miter gears and being fixedly mounted on a support at the front portion of the automobile body beneath the hood, flexible shafts connecting said miter gears and rotatable actuating parts of the latching elements respectively at the opposite sides of the hood, an interposed driving gear in working engagement with said pair of miter gears whereby to rotate the latter in opposite directions, and a controlling and manipulating shaft journaled on said supporting bracket and connected at one end to said intermediate driving gear whereby to rotate the latter in opposite directions, said controlling and manipulating shaft extending rearwardly into the automobile body and provided with manually operable means for effecting rotation thereof.

2. In an automobile hood locking assembly of the kind including keeper elements located inside the hood of the automobile on the opposite lower side wall portions of the hood and further including latching elements mounted on adjacent fixed parts of the automobile body frame and movable into and out of engagement with said keeper elements, said latching elements each having a rotatable actuating part, operating means for simultaneously moving the latching elements into and out of engagement with the keeper elements, said means comprising a bifurcated bracket member located beneath the hood and mounted upon the transverse wall of the automobile body constituting the rear closure of the hood, miter gears journaled in the respective arms of the bifurcated bracket member in opposed relation to each other, said miter gears having spindle extensions connected by flexible shafts to the rotatable actuating parts of said latching elements at opposite sides of the hood, a bearing bushing detachably secured in the base portion of said bifurcated bracket member axially coincident with a line midway between said miter gears and perpendicular to the axis of said gears, a driving gear in working engagement with said miter gears whereby to rotate them in opposite directions and having a spindle extension journaled in said bearing bushing, said spindle extension having an axial bore, and a controlling and manipulating shaft inserted at one end in said axial bore of the spindle extension of the driving gear and detachably secured to said spindle extension whereby the one part is rotatable by and with the other, said controlling and manipulating shaft extending into the automobile body proper and provided at its free end with an actuating element for effecting its rotation.

LUBAN BULAT.